United States Patent
Davis

(10) Patent No.: US 8,866,055 B2
(45) Date of Patent: Oct. 21, 2014

(54) MICROWAVE SPLATTER PREVENTION FABRIC COVER AND METHOD

(75) Inventor: Ashley Davis, Marvin, NC (US)

(73) Assignee: Splatterstop, LLC, Marvin, NC (US)

( * ) Notice: Subject to any disclaimer, the term of this patent is extended or adjusted under 35 U.S.C. 154(b) by 420 days.

(21) Appl. No.: 12/908,369

(22) Filed: Oct. 20, 2010

(65) Prior Publication Data

US 2011/0259882 A1    Oct. 27, 2011

Related U.S. Application Data

(60) Provisional application No. 61/253,127, filed on Oct. 20, 2009.

(51) Int. Cl.
| | | |
|---|---|---|
| *H05B 6/80* | (2006.01) | |
| *A47J 36/06* | (2006.01) | |
| *B65D 81/38* | (2006.01) | |
| *A47J 36/02* | (2006.01) | |
| *A47J 36/04* | (2006.01) | |

(52) U.S. Cl.
CPC .............. *A47J 36/027* (2013.01); *A47J 36/04* (2013.01); *A47J 36/06* (2013.01)
USPC ........... 219/734; 219/725; 428/74; 220/592.2

(58) Field of Classification Search
CPC .......... A47J 36/027; A47J 36/06; A47J 36/04
USPC ................. 219/734, 730, 432, 759, 735, 762; 220/592.2, 737, 367.1, 669, 200; 426/418, 234, 241, 243, 124, 129; 428/74, 138, 34.2, 99; 108/90; 99/DIG. 14
See application file for complete search history.

(56) References Cited

U.S. PATENT DOCUMENTS

| | | | | |
|---|---|---|---|---|
| 4,801,773 | A | | 1/1989 | Hanlon |
| 5,339,748 | A | * | 8/1994 | Bilotti ............................. 108/90 |
| 6,093,920 | A | | 7/2000 | Beckwith |
| 6,100,514 | A | | 8/2000 | Davis |
| 6,325,234 | B1 | | 12/2001 | Legaspi |
| D514,375 | S | | 2/2006 | Montano |
| 7,244,915 | B2 | | 7/2007 | Wright |
| 2003/0205575 | A1 | | 11/2003 | DeWinter |
| 2004/0164074 | A1 | * | 8/2004 | Newton ........................ 219/734 |
| 2004/0224059 | A1 | | 11/2004 | Esparza |
| 2007/0181584 | A1 | * | 8/2007 | Hoffner et al. ............. 220/592.2 |

* cited by examiner

*Primary Examiner* — Quang Van

(74) *Attorney, Agent, or Firm* — Clements Bernard PLLC; Lawrence A. Baratta, Jr.; Christopher L. Bernard

(57) ABSTRACT

The present disclosure describes a fabric cover for covering objects in a microwave. In an exemplary embodiment, the fabric cover is a fitted fabric cover (preferably made from organic or natural cotton material) that has a drawstring that can be used to secure the cover over a microwavable item. The fabric cover for microwave allows for food to be heated and keeps the microwave clean by covering the food and preventing it from splattering the inside of the microwave.

14 Claims, 4 Drawing Sheets

MICROWAVE SPLATTER PREVENTION FABRIC COVER AND METHOD

CROSS-REFERENCE TO RELATED APPLICATION(S)

The present non-provisional Utility Patent Application claims priority to U.S. Patent Application Ser. No. 61/253,127, filed Oct. 20, 2009, and entitled "FABRIC COVER," the contents of which are incorporated in full by reference herein.

FIELD OF THE INVENTION

The present invention relates generally to a fabric cover, and more particularly, to a fabric cover that may be removably disposed over a dish, container, or the like in a microwave oven and associated method of use and manufacture.

BACKGROUND OF THE INVENTION

Microwave ovens are widespread through the world to re-heat or cook food. One unfortunate aspect of cooking with a microwave is that food splatters as it is being heated and soils the inside of the microwave. People have used paper towels, plastic lids and other, non-secured disposable items to cover microwavable dishes to prevent dirtying the microwave. Unfortunately, none of the currently available items are able to consistently keep the area clean. Currently, the only material available with the express intent of covering food dishes while being cooked in a microwave is plastic which is disposable by nature. Plastic runs the risk of melting if heated to a high enough temperature. Additionally, they are easily stained and difficult to clean, thus making the cooking experience more difficult. It is also common practice to place a paper towel over a cooking dish in the microwave. This type of solution creates the issue of the paper towel falling off the food during the heating process, thus resulting in the food soiling the microwave. Also, paper towels are disposable.

BRIEF SUMMARY OF THE INVENTION

In various exemplary embodiments, the present invention relates to a fabric cover for dishes, plates, containers, etc. used in microwaves that, when fitted over an item containing food, will allow food items to be heated or cooked while preventing those items from splattering and soiling the surrounding area. In an exemplary embodiment, a fabric cover includes a fabric; a sleeve disposed around a periphery of the fabric; and a drawstring disposed within the sleeve; wherein the fabric is configured to be placed around an object for microwaving and secured to the object with the drawstring. The fabric can include one of bamboo, cotton, silk, linen, lycra, paper, wool, nylon, and blended combinations thereof, and the fabric cover can be machine washable or dishwasher safe and thereby reusable. Optionally, the fabric is between one and twenty four inches in diameter.

In another exemplary embodiment, a fabric cover for an object used in a microwave oven includes a top circle portion; a side wall portion; a drawstring seam formed in the side wall portion; and a drawstring disposed within the drawstring seam and exposed at openings in the drawstring seam. The fabric includes a porous material configured to allow heat to escape through the fabric. The top circle portion may include a diameter of approximately 13" and the side wall portion may include a height of approximately 2". The side wall portion forms a conical shape. The fabric cover may further include one or more cross-sections disposed or attached to the side wall portion.

In another exemplary embodiment, a method of cooking with a microwave oven includes obtaining an object for heating with the microwave oven; placing a fabric cover over the object; securing the fabric cover to the object with a drawstring disposed around an outer edge of the fabric cover; and heating the object in the microwave.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to a fabric cover that may be removably disposed over a dish, container, or the like in a microwave oven. Advantageously, the present invention prevents splatters and the like in the microwave oven interior thereby removing requirements to continually clean the microwave oven. Furthermore, the present invention is washable, reusable, environmentally-friendly, and the like.

Figure 1:
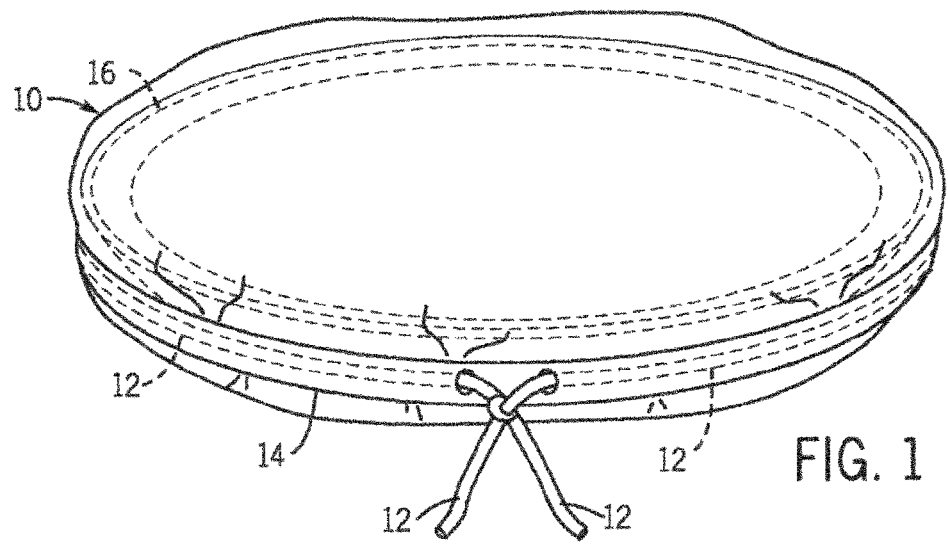
FIG. 1 is a perspective view of a fabric cover disposed over a first object according to an exemplary embodiment of the present invention.
Figure 2:
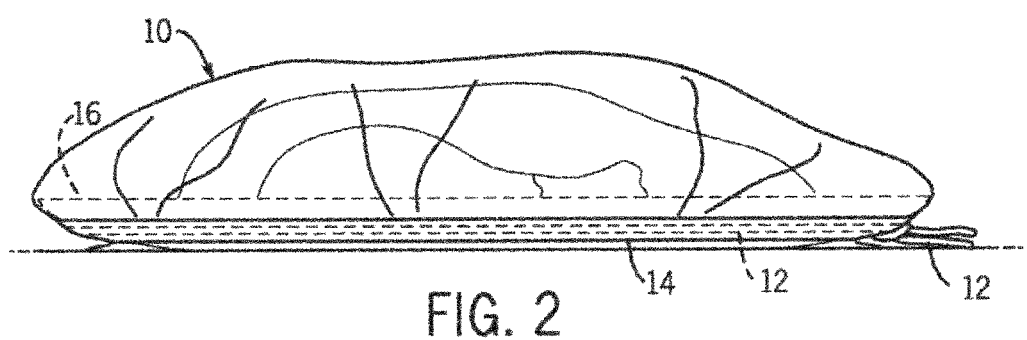
FIG. 2 is a side view of the fabric cover of FIG. 1 according to an exemplary embodiment of the present invention.
Figure 3:
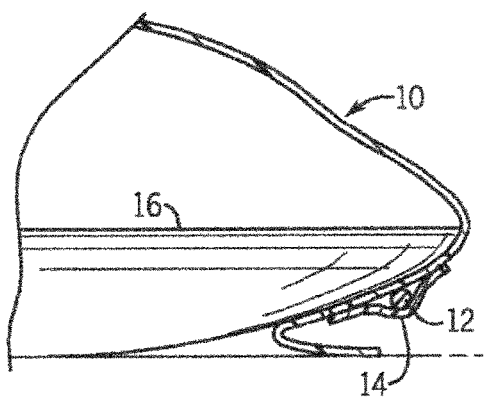
FIG. 3 is a detailed cross-section view of the fabric cover of FIG. 1 according to an exemplary embodiment of the present invention.
Figure 4:
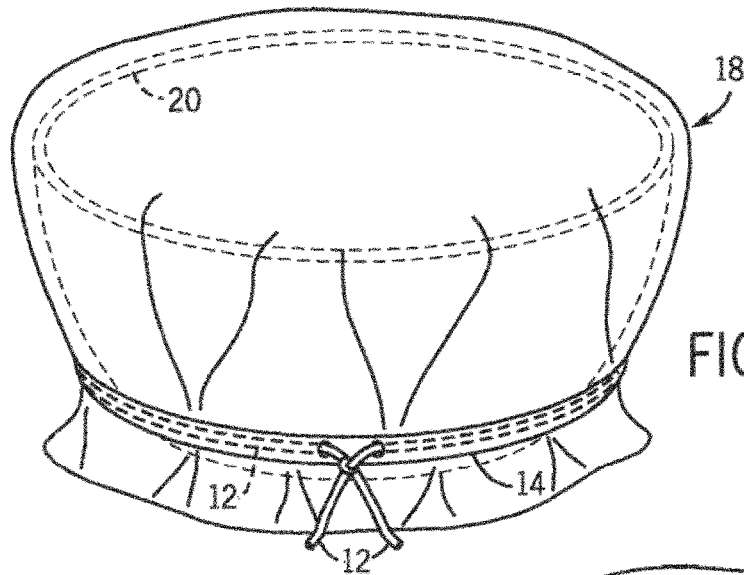
FIG. 4 is a perspective view of a fabric cover disposed over a second object according to an exemplary embodiment of the present invention.
Figure 5:
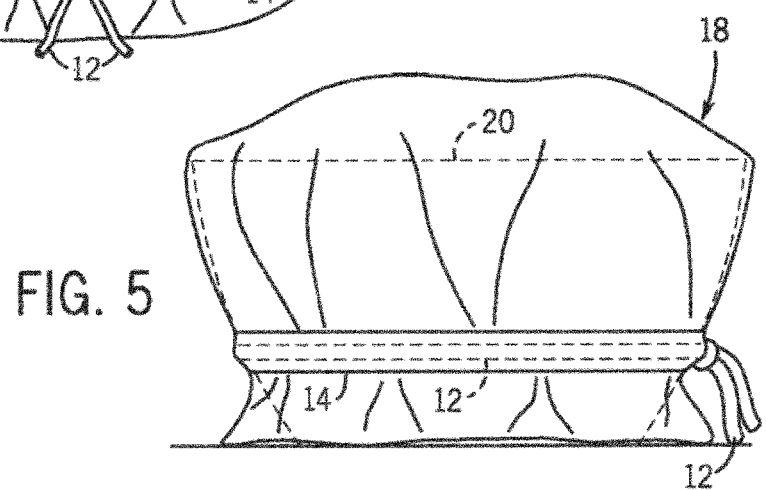
FIG. 5 is a side view of the fabric cover of FIG. 4 according to an exemplary embodiment of the present invention.
Figure 6:
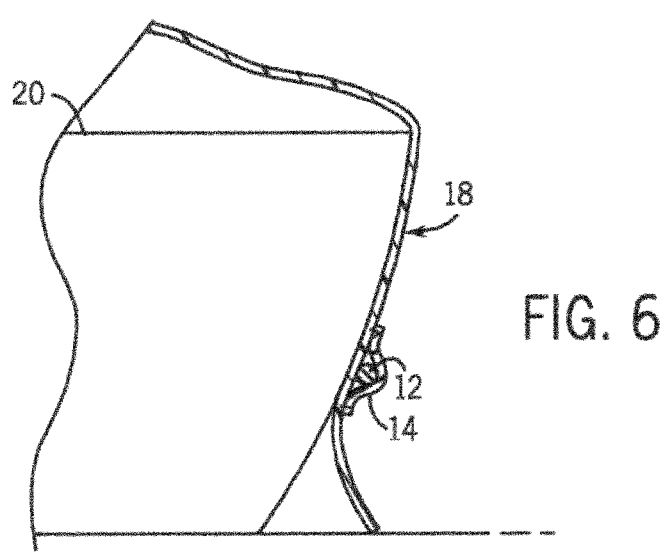
FIG. 6 is a detailed cross-section view of the fabric cover of FIG. 4 according to an exemplary embodiment of the present invention.

Referring to FIGS. 1-6, various views illustrate a fabric cover 10 according to exemplary embodiments of the present invention. The fabric cover 10 includes a drawstring 12 disposed around a periphery near outer edges of the fabric cover 10 and contained within a drawstring sleeve 14. FIGS. 1-3 illustrate the fabric cover 10 disposed around a first object, such as a plate 16, and FIGS. 4-6 illustrate a fabric cover 18 disposed around a second object, such as a bowl 20. When placed over a microwavable item, such as the plate 16 or bowl 20, the drawstring 12 can be pulled to tighten the fabric cover 10, 18 and make it fit snugly over the item. Thereafter, the microwavable item can be heated within a microwave oven (not shown) without food splatter from the item exiting the fabric cover 10, 18. Note, the fabric cover 10, 18 can be the same. The drawstring 12 enables the fabric cover 10, 18 to fit to a range of sizes associated with the plate 16, the bowl 20, etc.

In an exemplary embodiment, the fabric cover 10, 18 can be made out of organic or natural cotton material. Additionally, it should be noted that the fabric cover 10, drawstring 12, and drawstring sleeve 14 can be made of various materials, including, but not limited to, microwave safe fabrics (bamboo, cotton, silk, linen, lycra, paper, wool, nylon, blended combinations and more), plastics, paper or wood. These materials, which are porous in nature will allow for the heat generated in the microwave process to vent and escape from under the cover 10.

It is preferable to use a material that can be cleaned so that the fabric cover 10, 18, if not disposed of, can be washed and re-used. In an exemplary embodiment, the fabric cover 10, 18 can be machine washable or dishwasher safe thereby enabling the cover 10, 18 to be washed with the plate 16, the bowl 20, etc. in the dishwasher. The fabric cover 10, 18 can also be made by using different shapes, stretchable materials, elastic bands, pursed string or pursed stitching in place of a drawstring, or can be large enough to cover a microwavable item either without being secured or by completely wrapping the item inside the cover 10, 18. It can also be a sac in which one places a microwavable item with the closure at any location.

In an exemplary use, the fabric cover 10, 18 can be used to cover a dish of pasta with tomato sauce for re-heating in the microwave. Here, one can take the dish with the food in it, place the fabric cover 10, 18 over the dish, pull the drawstring 12 to secure it around the dish, place the covered dish in the microwave and heat the item. The fabric cover 10, 18 allows the food to heat up while keeping the microwave clean. It is crucial to note that the fabric dish cover for microwave should not be used in a conventional, convection or toaster oven and should not be used in any "bake" mode that can be part of a microwave.

FIGS. 1-2 illustrate perspective views of the fabric cover 10 disposed over the plate 16. In this exemplary embodiment, the fabric cover 10 is generally circular in nature and ranging in diameter from one inch to up to twenty four inches as to cover any type of open container which could be placed into a microwave. Those of ordinary skill in the art will recognize that other sizes and shapes are also contemplated for the fabric cover 10. As shown here, the fabric cover 10 completely covers the plate 16 including food or the like on the plate 16. Note, a top portion of the fabric cover 10 expands over the plate 16 and the associated food. The drawstring 12 is disposed to the fabric cover 10 via the drawstring sleeve 14 which may be integrally formed or attached to the fabric cover 10. In an exemplary embodiment, the drawstring sleeve 14 includes the same material as the fabric cover 10 and is sewed to the fabric cover 10 with the drawstring 12 located between the drawstring sleeve 14 and the fabric cover 10. In this manner, the drawstring 12 and the drawstring sleeve 14 may be positioned below the plate 16 and the drawstring 12 may be tightened, tied, etc. to form a seal of the fabric cover 10 around and over the plate 16.

FIG. 3 illustrates a cross-sectional partial view of an interior of the fabric cover 10 showing the plate 16 and a seal formed by the drawstring 12 and the fabric cover 10 to the plate 16. Specifically, in this exemplary embodiment, the drawstring sleeve 14 is sewn or the like on the fabric cover 10. There is an interior portion between the drawstring sleeve 14 and the fabric cover 10 housing the drawstring 12. By tightening the drawstring 12, the drawstring sleeve 14 and the fabric cover 10 are formed based on the tightening thereby forming a seal to the plate 16 under the plate 16. Food and any associated splatter is thereby caught by the fabric cover 10 in the interior of the fabric cover 10 and either stopped by the fabric cover 10 or returned to the plate 16. The corresponding seal from the drawstring prevents leakage.

FIGS. 4-5 illustrate perspective views of the fabric cover 18 disposed over the bowl 20. In this exemplary embodiment, the fabric cover 18 is generally circular in nature and ranging in diameter from one inch to up to twenty four inches as to cover any type of open container which could be placed into a microwave. Those of ordinary skill in the art will recognize that other sizes and shapes are also contemplated for the fabric cover 18. In an exemplary embodiment, the fabric cover 10 can be the same as the fabric cover 18, i.e. sized to fit both over the plate 16 and the bowl 20. As shown here, the fabric cover 18 completely covers the bowl 20 including food or the like disposed in the bowl 20 Note, a top portion of the fabric cover 18 expands over a top of the bowl 20 and the associated food within the bowl 20. The drawstring 12 is disposed to the fabric cover 18 via the drawstring sleeve 14 which may be integrally formed or attached to the fabric cover 18. In an exemplary embodiment, the drawstring sleeve 14 includes the same material as the fabric cover 18 and is sewed to the fabric cover 18 with the drawstring 12 located between the drawstring sleeve 14 and the fabric cover 18. In this manner, the drawstring 12 and the drawstring sleeve 14 may be positioned below or on the sides of the bowl 20 and the drawstring 12 may be tightened, tied, etc. to form a seal of the fabric cover 18 around and over the bowl 20.

FIG. 6 illustrates a cross-sectional partial view of an interior of the fabric cover 18 showing the bowl 20 and a seal formed by the drawstring 12 and the fabric cover 18 to the bowl 20. Specifically, in this exemplary embodiment, the drawstring sleeve 14 is sewn or the like on the fabric cover 18. There is an interior portion between the drawstring sleeve 14 and the fabric cover 18 housing the drawstring 12. By tightening the drawstring 12, the drawstring sleeve 14 and the fabric cover 18 are formed based on the tightening thereby forming a seal to the bowl 20 around sides of the bowl 20. Food and any associated splatter is thereby caught by the fabric cover 18 in the interior of the fabric cover 18 and either stopped by the fabric cover 18 or returned to the bowl 20. The corresponding seal from the drawstring prevents leakage.

Advantageously, the present invention provides a porous cover such that heat may escape during the heating process, unlike plastic covers. Also, the present invention provides a reusable solution thereby limiting waste. The cover 10, 18 can fit snuggly with the drawstring 12 to different shaped items thereby preventing food from escaping versus conventional towels and other solutions.

Figure 7:
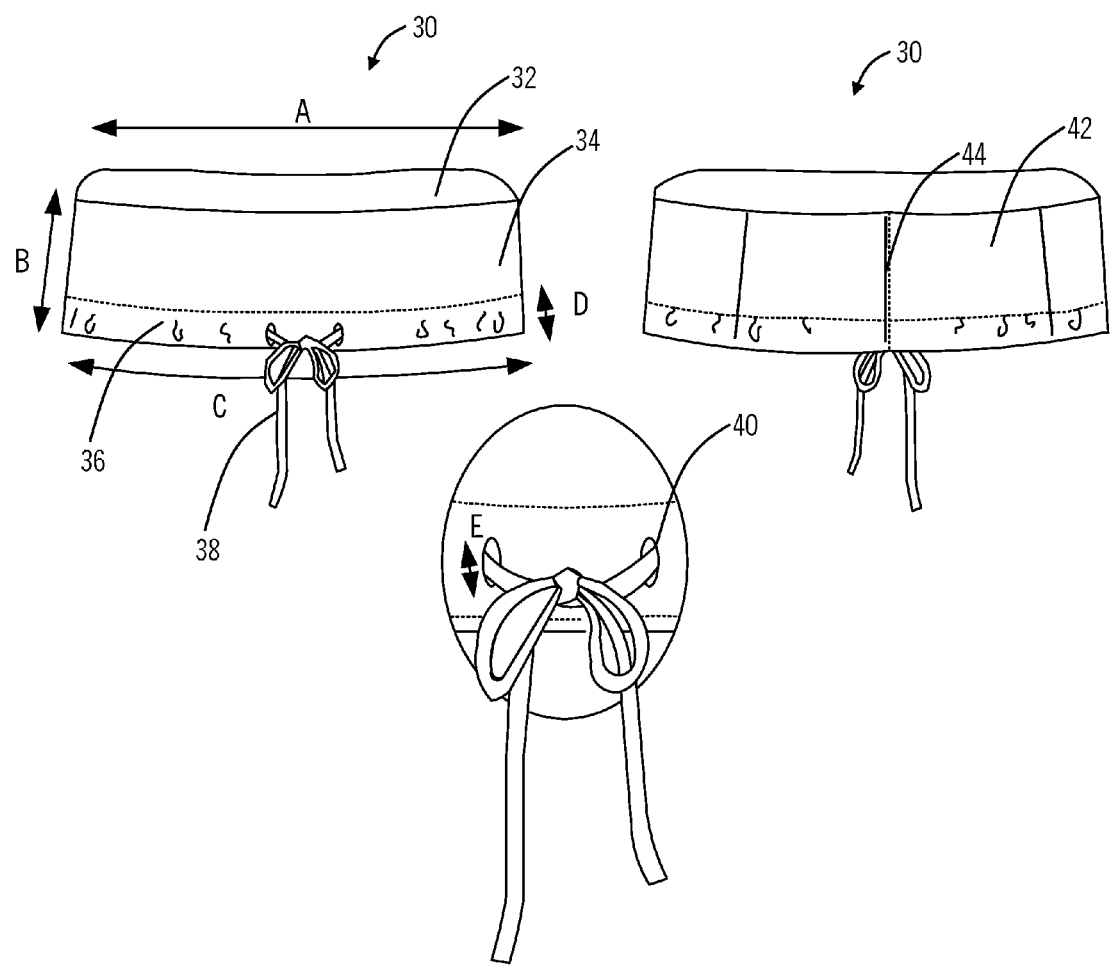
FIG. 7 is various perspective views of a fabric cover for use with a plate, bowl, or the like according to an exemplary embodiment of the present invention.

Referring to FIG. 7, various views illustrate a fabric cover 30 according to an exemplary embodiment of the present invention. Similar to the fabric covers 10, 18, the fabric cover 30 is configured to fit over the plate 16, the bowl 20, or the like during microwave cooking to prevent splatters. The fabric cover 30 is dimensioned appropriately to fit over both the plate 16 and the bowl 20. In particular, the fabric cover 30 includes a top portion 32, a side wall portion 34, a side panel piece 36, and a drawstring 38. In this exemplary embodiment, the top portion 32, the side wall portion 34, and the side panel piece 36 form a frustoconcical shape whereby a diameter A of the top portion 32 is slightly smaller than a diameter C of the side panel piece 36. Alternatively, the top portion 32, the side wall portion 34, and the side panel piece 36 form a conical shape whereby the diameters C and A are approximately equal when the drawstring 40 is untied. In one exemplary embodiment, the top portion 32, the side wall portion 34, and the side panel piece 36 are integrally formed from one material. In another exemplary embodiment, the top portion 32, the side wall portion 34, and the side panel piece 36 are attached together from different materials. The fabric cover 30 may be formed from materials including, but not limited to, microwave safe fabrics (bamboo, cotton, silk, linen, lycra, paper, wool, nylon, blended combinations and more), plastics, paper or wood. These materials, which are porous in nature will allow for the heat generated in the microwave process to vent and escape from under the cover 30.

The side panel piece 36 is configured to form a channel around an outside (or inside) of the side wall portion 34 housing the drawstring 38. Accordingly, pulling the drawstring 38 constricts the side wall portion 34 such that the diameter C shrinks and forms a seal with the plate 16, the bowl 20, etc. In one exemplary embodiment, the side panel piece 36 extends from the side wall portion 34 and is folded and sewn into the side wall portion 34 with the drawstring 38 in place. The side panel piece 36 may include openings 40 through which the drawstring 38 is accessed and tied in place. Similar to the fabric covers 10, 18, it is preferable to use a material that can be cleaned so that the fabric cover 30, if not disposed of, can be washed and re-used. In an exemplary embodiment, the fabric cover 30 can be dishwasher safe thereby enabling the cover 30 to be washed with the plate 16, the bowl 20, etc. in the dishwasher. The fabric cover 30 can also be made by using different shapes, stretchable materials, elastic bands, pursed string or pursed stitching in place of a drawstring, or can be large enough to cover a microwavable item either without being secured or by completely wrapping the item inside the cover 30. It can also be a sac in which one places a microwavable item with the closure at any location.

In an exemplary embodiment, interior walls 42 of the fabric cover may include one or more cross-sections 44 providing support. These cross-sections 44 may be formed or attached to the side wall portion 34. Also, the cross-sections 44 may be on the exterior of the fabric cover 30. The cross-sections 44 are configured to maintain an open area on the interior of the fabric cover 30 such that food or the like on the plate 16, the bowl 20, etc. is not in contact with the fabric cover 30. The cross-sections 44 may be made of rigid but microwavable safe material such as, but not limited to, corded fabric, wood strips or other material yet to be determined. This support is intended to give the fabric the support needed to not collapse on to the food over time with multiple use. In another exemplary embodiment, the top portion 32 may also include optional cross-section providing support thereon. These may be similar to the cross-sections 44.

In one exemplary embodiment, the fabric cover 30 includes sizes of approximately 11-15", preferably 13", on the diameter A, approximately 11-15", preferably 13", on the diameter C, approximately 0.5" on a width D of the drawstring seam, approximately 0.5" on a width E of the openings 40, and approximately 1-4", preferably 2", on a side height B.

Figure 8:
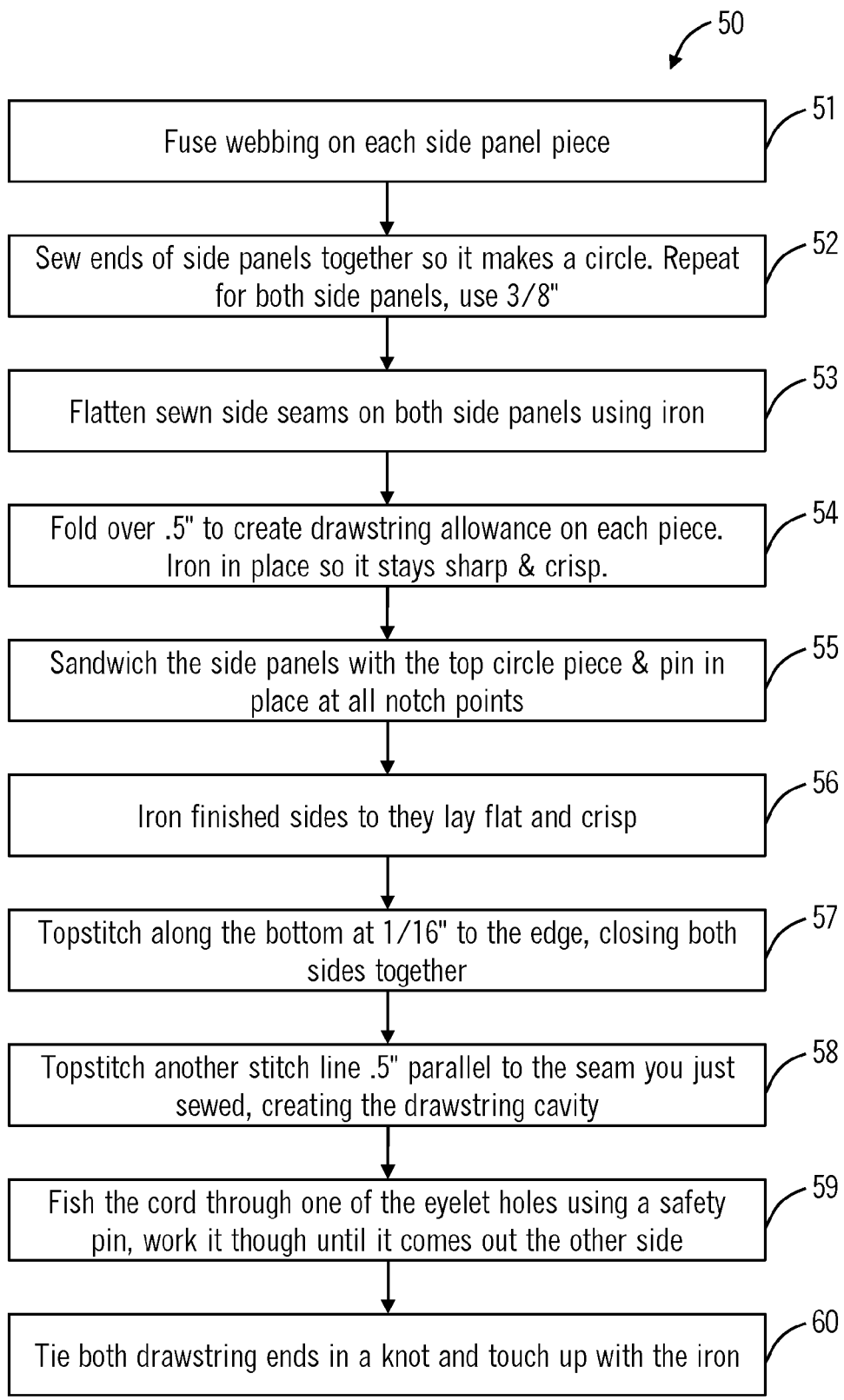
FIG. 8 is a flowchart of a manufacture method of a fabric cover according to an exemplary embodiment of the present invention.

Referring to FIG. 8, a flowchart illustrates an exemplary manufacture method of the fabric covers 10, 18, 30 according to an exemplary embodiment of the present invention. In this exemplary embodiment, the fabric cover is manufactured with a thick canvas for side walls and the side piece wall, a thin canvas for the top circle panel, an optional fusable web, and a nylon string. First, webbing is fused on each side panel piece (step 51). Ends of each of the side panels are sewn together so as to form a circle and this is repeated for both side panels (step 52). Using an iron, sewn side seams are flattened on both sides (step 53). Approximately 0.5" is folded over to create a drawstring allowance on each piece and is ironed in place (step 54). The side panels are sandwiched with the top circle piece pinned in place at all notch points (step 55). The finished sides are ironed to lay flat and crisp (step 56). The side panels are topstitched along the bottom at approximately 1/16" to the end closing both sides together (step 57). Another stitch line is topstitched 0.5" parallel to the seam that is just sewn creating the drawstring cavity (step 58). A nylon cord is fished through one of the eyelet holes using a pin until it comes out the other side (step 59). The drawstring is tied into a knot and an iron is used to touch up (step 60).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A fabric cover, comprising:
a fabric dimensioned to fit on top of an item comprising an open top and a base forming a splatter proof barrier;
a sleeve disposed around a periphery near outer edges of the fabric, wherein the outer edges are disposed on a side panel of the fabric; and
a drawstring disposed within the sleeve dimensioned to fit snugly over the base of the item or a bottom of the item with a range of sizes associated with the item, wherein the fabric comprises a frustoconcical shape whereby a diameter of a top portion of the fabric is slightly smaller than a diameter of the side panel when the drawstring is not secured, wherein the frustoconcical shape enables the fabric to fit with the range of sizes and shapes of the item;
wherein the fabric is configured to be placed around an object for microwaving and secured to the object with the drawstring that is pulled to tighten the fabric sealing the open top from splatter therefrom; and
wherein the fabric comprises a porous material configured to allow generated heat of a microwave process to vent and escape from inside the open top and base through the fabric, and wherein the fabric and the drawstring are reusable.

2. The fabric cover of claim 1, wherein the fabric comprises one of bamboo, cotton, silk, linen, lycra, paper, wool, nylon, and blended combinations thereof.

3. The fabric cover of claim 1, wherein the fabric is dishwasher safe and thereby reusable, enabling the cover to be washed with an object.

4. The fabric cover of claim 1, wherein the fabric is between one and twenty four inches in diameter.

5. The fabric cover of claim 1, further comprising one or more cross-sections disposed to the fabric providing support to fabric walls.

6. The fabric cover of claim 1, wherein the fabric is made using different shapes, stretchable materials, elastic bands, pursed string or pursed stitching in a drawstring that are large enough to cover the microwavable item without being secured by completely wrapping inside the cover.

7. The fabric cover of claim 1, wherein the fabric comprises bamboo.

8. The fabric cover of claim 1, wherein the fabric comprises cotton.

9. The fabric cover of claim 1, wherein the fabric comprises silk.

10. The fabric cover of claim 1, wherein the fabric comprises nylon.

11. A fabric cover for an object used in a microwave oven, comprising:
a top circle portion;

a side wall portion, the top circle portion and the side wall portion joined together and dimensioned to fit on top of an item comprising an open top and a base forming a splatter proof barrier;

a drawstring seam formed in the side wall portion in a sleeve and; and a drawstring disposed within the drawstring seam and exposed at openings in the drawstring seam dimensioned to fit snugly over the base of the item with a range of sizes associated with the item, wherein the top circle portion and the side wall portion comprise a frustoconcical shape whereby a diameter of the top circle portion is slightly smaller than a diameter of the side wall portion when the drawstring is not secured, wherein the frustoconcical shape enables the fabric to fit with the range of sizes and shapes of the item;

wherein the fabric comprises a porous material configured to allow generated heat of a microwave process to vent and escape from inside the open top and base through the fabric, and wherein the fabric cover is reusable.

12. The fabric cover of claim 11, wherein the top circle portion comprises a diameter of approximately 13" and the side wall portion comprises a height of approximately 2".

13. The fabric cover of claim 11, wherein the side wall portion forms a conical shape.

14. The fabric cover of claim 11, further comprising one or more cross-sections disposed or attached to the side wall portion.

* * * * *